United States Patent
Donner et al.

(10) Patent No.: US 9,606,419 B2
(45) Date of Patent: Mar. 28, 2017

(54) ADAPTIVE PHOTOTHERMAL LENS

(71) Applicants: FUNDACIÓ INSTITUT DE CIÈNCIES FOTÒNIQUES, Barcelona (ES); INSTITUCIÓ CATALANA DE RECERCA I ESTUDIS AVANÇATS, Barcelona (ES)

(72) Inventors: Jon Donner, Barcelona (ES); Renaud Marty, Barcelona (ES); Romain Quidant, Barcelona (ES)

(73) Assignees: FUNDACIÓ INSTITUT DE CIÈNCIES FOTÒNIQUES, Castelldefels (ES); INSTITUCIÓ CATALANA DE RECERCA I ESTUDIS AVANÇATS, Barcelona (ES)

( * ) Notice: Subject to any disclaimer, the term of this patent is extended or adjusted under 35 U.S.C. 154(b) by 286 days.

(21) Appl. No.: 14/222,349

(22) Filed: Mar. 21, 2014

(65) Prior Publication Data
US 2015/0268532 A1    Sep. 24, 2015

(51) Int. Cl.
*G02B 26/08*    (2006.01)
*G02F 1/29*    (2006.01)
*G02F 1/01*    (2006.01)
*G02B 3/12*    (2006.01)
*G02B 5/00*    (2006.01)
(Continued)

(52) U.S. Cl.
CPC .............. *G02F 1/293* (2013.01); *G02B 3/12* (2013.01); *G02B 5/008* (2013.01); *G02F 1/0147* (2013.01); *B82Y 20/00* (2013.01); *G02B 3/0037* (2013.01); *G02F 2201/08* (2013.01); *G02F 2203/10* (2013.01); *Y10S 977/773* (2013.01); *Y10S 977/81* (2013.01)

(58) Field of Classification Search
CPC ........ G02B 3/12; G02B 5/008; G02B 3/0037; G02F 1/0147; G02F 1/293; B82Y 20/00; Y10S 977/773; Y10S 977/81
USPC ............. 359/212.1, 223.1, 221.1–221.2, 359/225.1–226.2, 741, 900, 319, 288, 359/298–299; 977/773, 810
See application file for complete search history.

(56) References Cited

U.S. PATENT DOCUMENTS

| 4,872,743 A | 10/1989 | Baba et al. |
| 7,828,435 B1 | 11/2010 | Rehse |
| 2005/0117195 A1 | 6/2005 | Glebov et al. |

(Continued)

FOREIGN PATENT DOCUMENTS

| DE | 102007051291 | 4/2009 |
| EP | 1304591 A1 | 4/2003 |

OTHER PUBLICATIONS

International Search Report and Written Opinion for International Application No. PCT/EP2015/061683 dated Sep. 23, 2015.

*Primary Examiner* — James Phan
(74) *Attorney, Agent, or Firm* — Jenkins, Wilson, Taylor & Hunt, P.A.

(57) ABSTRACT

An adaptive photo thermal lens comprising at least one cell, each cell provided with at least one photo absorbing particle, a thermo-optical material in thermal contact with the cells and at least one controllable light source for illuminating the photo absorbing particles, the light source having at least one spectral component which can be absorbed by the photo-absorbing particles and being controllable in wavelength and/or power and/or polarization.

20 Claims, 9 Drawing Sheets

(51) Int. Cl.
 *B82Y 20/00* (2011.01)
 *G02B 3/00* (2006.01)

(56) References Cited

U.S. PATENT DOCUMENTS

| | | |
|---|---|---|
| 2011/0080569 A1 | 4/2011 | Eva et al. |
| 2013/0194323 A1 | 8/2013 | Choi et al. |
| 2015/0346394 A1 | 12/2015 | Donner |
| 2016/0178516 A1* | 6/2016 | Abdulhalim ......... G01N 21/554 356/364 |

* cited by examiner

ADAPTIVE PHOTOTHERMAL LENS

FIELD

The present disclosure generally relates to photothermal lenses, and more particularly to lenses that have the ability of changing their properties by an induced temperature change and thus exhibit tunable properties.

BACKGROUND

In the current general trend towards miniaturization, integrated micro-optical elements have played a central role in data storage, optical displays and imaging systems. Fine alignment and focus adjustment in these systems is usually performed by means of mechanical parts that are often expensive, fragile and slow.

To overcome limitations introduced by mechanical adjustment, different electrical based inventions have been proposed. A first strategy relies on reshaping the surface of a liquid using an electrical signal without altering the thermo-optical properties of the material. For instance, the electro wetting lens described in U.S. Patent Application Publication No. 20130194323 demonstrates that the shape of a liquid drop can be modified by applying a voltage. The local voltage applied to the surface changes the contact angle between the drop and the surface, thus modifying the shape of the drop, which results in a change of the focal point associated to the liquid based micro lens. Nevertheless, such an approach suffers from drawbacks, which include (but are not restricted to) difficulties of integration, slow time response (in some applications, acceleration of the system could alter the shape of the drop and introduce imperfections in the lens) and inability to simultaneously image multiple planes with a single lens.

A second strategy uses an electrical excitation to deliver energy which alters the lensing material, placed between two electrodes, and tunes its properties. Following this strategy, an electrically excited thermo-optical lens as disclosed in U.S. Patent Publication No. 2005/0117195 has been invented. In this patent, a thermo-optical polymer is enclosed between two optically transparent surfaces, one of them curved, and a temperature controller is coupled to the thermo-optical material. This invention allows for the change of focal property of the such formed lens by changing the temperature. Although the entire focal plane of a single lens can be changed this invention does not allow for finer control such as local adjustment of the focal point, resulting in different focal planes induced by a single element. Furthermore, when considering this invention in a matrix configuration, there is a need to electrically address each lens, which could result in a complex engineering of the lens system, prohibiting its use in some applications.

Generally, electrical excitation can be limiting for some applications. To overcome the obstacles posed by mechanical and electrical induced lensing, inventions of optically controlled lenses appear to be relevant. Indeed, optical control eliminates the need to electrically wire each lensing element, and allows for remote control over the lens properties. Furthermore, eliminating the electric wiring or mechanical elements can help improve the transparency of the optical element. Along this line, a first strategy relies on reshaping the surface of a liquid using an optical signal without altering the thermo-optical properties of the material, where light energy is used to modify the surface energy of liquid droplets, which enables to control their shape. For example, liquid drops can be placed on a photo responsive layer, which is placed between a support layer and the droplet. As described in European Patent No. 1304591, the droplet can be selectively irradiated with a light source which modifies the surface energy and thus the contact angle between the droplet and the layer, resulting in a variation of the focal length and the lateral position of the focal spot of the micro-lens. This lens still presents most of the drawbacks associated to electro wetting lenses including the ones described previously (difficulty of integration, slow time response and inability to simultaneously image multiple planes with a single lens).

SUMMARY

The subject matter of the present disclosure has been developed in response to the present state of the art, and in particular, in response to the limitations of conventional display and imaging systems. Accordingly, the subject matter of the present disclosure has been developed to provide adaptive photothermal lenses that overcome at least some of the above-discussed shortcomings of the prior art.

The present disclosure generally relates to an adaptive photo thermal lens that includes at least one cell. Each cell includes at least one photo absorbing particle and the adaptive photo thermal lens further includes a thermo-optical material in thermal contact with the cells. In one embodiment, at least one spectral component may be emitted from at least one controllable light source that can be absorbed by the photo-absorbing particles, wherein each cell is defined by the optical interaction area between the at least one photo absorbing particle and the at least one controllable light source.

In one embodiment, the photo absorbing particles are patterned on a substrate. In another embodiment, the photo absorbing particles are plasmonic particles that have a plasmonic resonance. In such an embodiment, the at least one controllable source can be adapted to emit light at the plasmonic resonance. In one embodiment, the plasmonic particles are one or more of nano antennas, nanorods, nano holes, nanoparticles, nano stars, nano oligomers and/or multi branch nano particles. In one implementation, the plasmonic particles are Au nano particles.

In one embodiment, the thermo-optical material may be water, glycerol or octane, among others. In one embodiment, the adaptive photo thermal lens can be implemented as an array of cells. In some implementations, for example, each cell may be defined by the spot size of the at least one controllable light source. In yet other implementations, for example, the cells may be defined by the physical location of the photo absorbing particles. In one embodiment, the at least one controllable light source is a single source and the adaptive photo thermal lens further comprises a galvanometric mirror for providing different positions of a spot of the single source. In another embodiment, a plurality of light sources may be included. In yet another embodiment, the at least one photo absorbing particle is patterned onto an already existing lens.

The present disclosure further relates to a micro lens array. The micro lens array includes a plurality of adaptive photo thermal lenses that each includes at least one cell with at least one photo absorbing particle and a thermo-optical material in thermal contact with the cells. The micro lens array further includes at least one controllable light source for illuminating the photo absorbing particles, the light source having at least one spectral component which can be absorbed by the photo-absorbing particles. Each cell may be defined by the optical interaction area between the at least one photo absorbing particle and the at least one controllable light source. In one embodiment, the at least one controllable light source is controllable in one or more of wavelength, power, and polarisation;

The photo absorbing particles may be plasmonic particles and may have a plasmonic resonance. In such an embodiment, the at least one controllable source can be adapted to emit light at the plasmonic resonance. In one embodiment, the plasmonic particles are one or more of nano antennas, nanorods, nano holes, nanoparticles, nano stars, nano oligomers and/or multi branch nano particles. In one implementation, the plasmonic particles are Au nano particles. In one embodiment, the at least one controllable light source is a single source and the adaptive photo thermal lens further comprises a galvanometric mirror for providing different positions of a spot of the single source. In another embodiment, a plurality of light sources may be included. In yet another embodiment, the at least one photo absorbing particle is patterned onto an already existing lens.

The present disclosure further relates to a method for using adaptive photo thermal lenses. The method includes providing at least one adaptive photo thermal lens and providing at least one controllable light source. The method further includes illuminating at least one spot of the photo absorbing particles with the at least one controllable light source, thereby modulating the refractive index of a portion of thermo-optical material. The at least one controllable light source may be a single source and the micro lens array may further include a galvanometric mirror. In such an embodiment, the method may further include manipulating the galvanometric mirror to change position of the spot that is illuminating the photo absorbing particles. The method may also include using the at least one adaptive photo thermal lens to control light from a second light source. For example, the focal depth of the second light source may be controlled.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to features, advantages, or similar language does not imply that all of the features and advantages that may be realized with the subject matter of the present disclosure should be or are in any single embodiment of the subject matter. Rather, language referring to the features and advantages is understood to mean that a specific feature, advantage, or characteristic described in connection with an embodiment is included in at least one embodiment of the subject matter of the present disclosure. Thus, discussion of the features and advantages, and similar language, throughout this specification may, but do not necessarily, refer to the same embodiment.

The present disclosure uses an optical excitation to deliver energy which alters the thermo-optical properties of the lensing material and enables a fine tuning of its optical properties. The above mentioned drawbacks are thus solved by providing an adaptive lens that is easy to integrate in any optical device for both a single and a matrix of lenses. Also, it is fast, robust and can be cheap. Furthermore, it permits local adjustment of the focal point resulting in different focal planes induced by a single element. Note that by "light source" it is meant electromagnetic radiation, including but not limited to X-Rays, ultraviolet, visible, infrared, near infrared, short wavelength infrared, mid wavelength infrared, long wavelength infrared, far infrared, radiowave and radar sources. In this way, a predetermined distribution of temperature is created within the thermo-optical material.

Examples of thermo optical materials include various liquids (such as water, octane, alcohols, glycerol, biological medium (blood, plasma, etc)), gases (such as air, helium) and solids (such as glass silica quartz, plastics or polymers). The change in refractive index is driven by the temperature profile, resulting in a local patterning of the refractive index. In this manner, the focal length in at least one location may be adjusted, and the focal length throughout the plane can be locally modified. This modification can be performed in a continuous fashion resulting in a continuous control of the focal length or in discrete steps, leading to an array/matrix of individual thermal lenses. In the latter implementation, the disclosure may comprise thermal barriers (materials of different thermal conductivity) between adjacent temperature controlled regions to provide thermal isolation between regions. The barriers can be applied by evaporation or sputtering and using a mask to pattern their location. The same process would be applied for a solid, liquid or gas phase thermo-optical material. In yet another aspect of the disclosure, a method of modifying an existing lens is proposed, where the photo absorbing particles are patterned onto the existing lens with the same techniques as explained before, which will act as the thermo-optical material, and when shined on with a light source can change the focal depth and lateral position of the original existing lens.

Figure 4A:
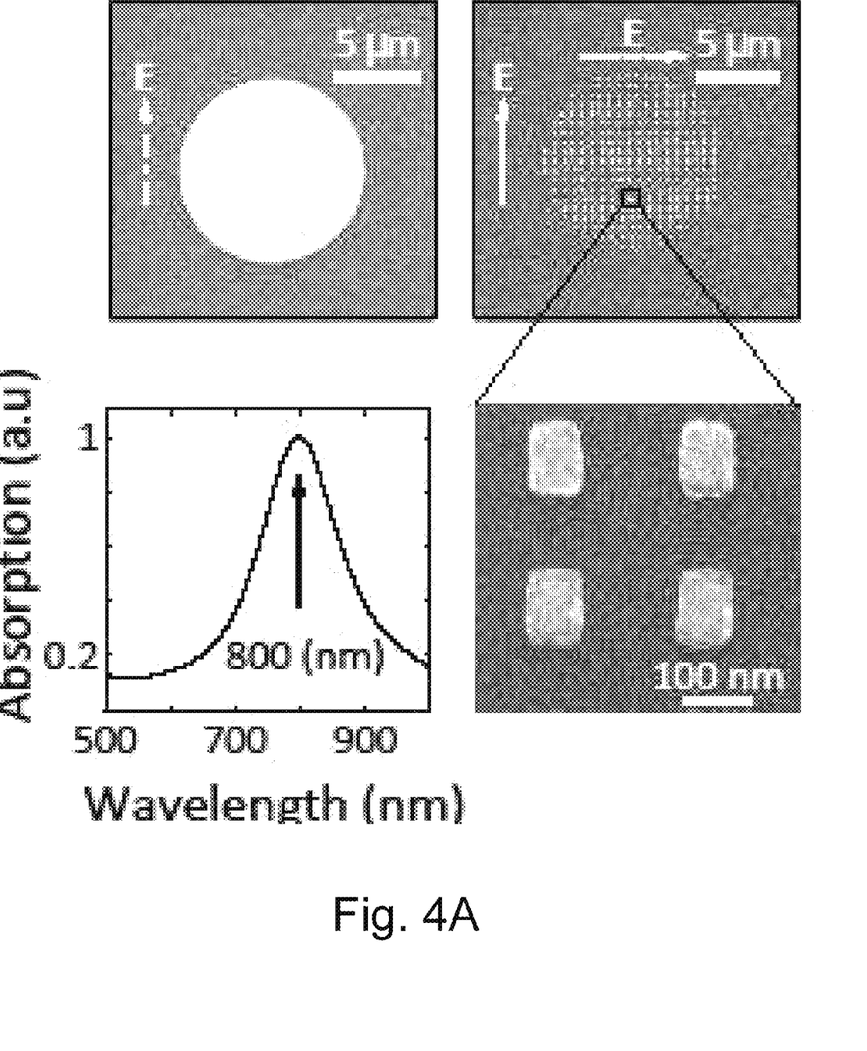
FIGS. 4A-E present experimental results obtained on different configurations using various patterns of photo-absorbing material for different heating light source properties.

The subject matter of the present disclosure relates to one or an array of photoabsorbing particles, a thermo-optical material in thermal contact with said photoabsorbing particles, and at least one controllable light source for illuminating them. The light source can have at least one spectral component which can be absorbed by the photo-absorbing particles and being controllable in power and/or polarisation and/or wavelength. By thermal contact it is implicit that physical contact is not necessary. In other words, the disclosure can incorporate any material between the absorbers and the thermo optical material as long as the photoabsorbing particles change temperature when illuminated. In this context, the term "cell" is defined as the optical interaction area overlapping between one or an array of photoabsorbing particles and a heating light source (e.g., a micrometric gold disk as shown in FIG. 4A top left, or also a smaller particle or an array of nanostructures, like gold nano-antennas in FIG. 4A right top and bottom or FIG. 5B).

Figure 1:
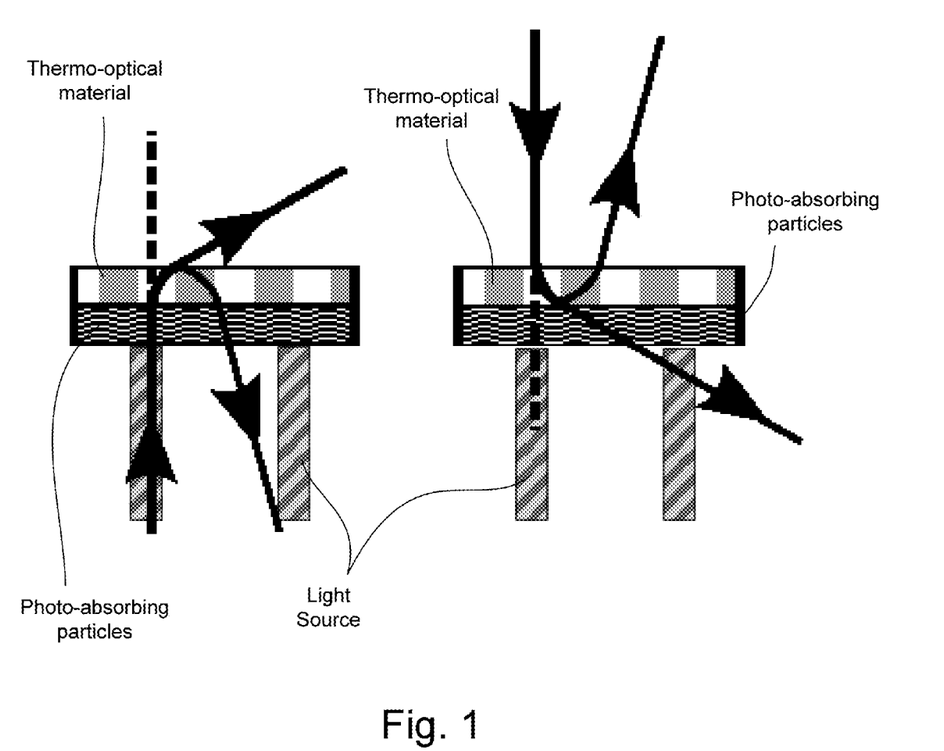
FIG. 1 is a schematic illustration of the principle of a thermal induced lens according to one embodiment.

The image focal plane of the disclosure can be dynamically shaped by a control optical signal from the source. The approach relies on the temperature dependence of the refractive index of some materials and the ability of photo absorbing materials to generate heat and create a predetermined distribution of temperature when illuminated with light. A local increase of temperature induces a change in the refractive index that affects the propagation of light. As illustrated in FIG. 1, a patterned absorbing material absorbs at least a part of a light source. This energy absorption results in a temperature increase of a thermo-optical material that is in thermal contact with at least a part of the photo-absorbing particles. Therefore, the optical index of the thermo-optical material is modulated in space and time depending on the light absorption. This optical index modulation deviates/refracts a second light source when the latter crosses the thermo-optical material. The second light source lensed by the optical index modulation can arrive at the thermo-optical material either through the absorbing material (FIG. 1 left) or directly to the thermo-optical material (FIG. 1 right). Also, depending on the reflectivity/transmission of the system, the subject matter of the present disclosure can be used in transmission and/or in reflection (in both left and right portions of FIG. 1, the second light source is transmitted and/or reflected).

Figure 2A:
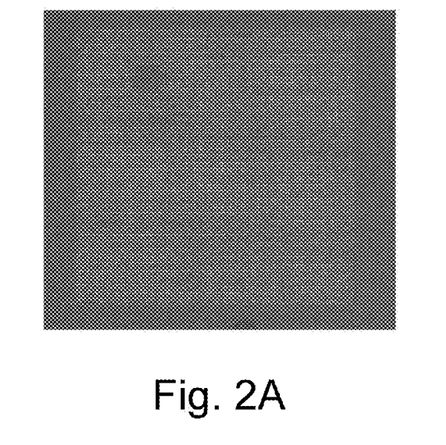
FIGS. 2A-F display various morphological photo absorber and light source patterns, which define cells and lensing locations.
Figure 2B:
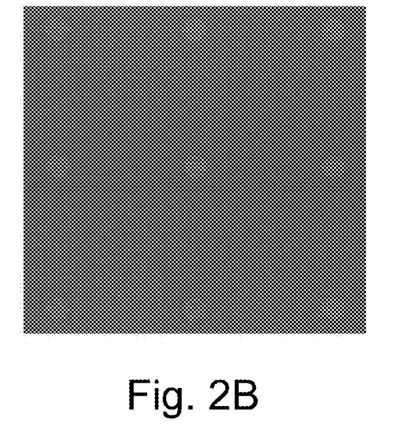
Figure 2C:
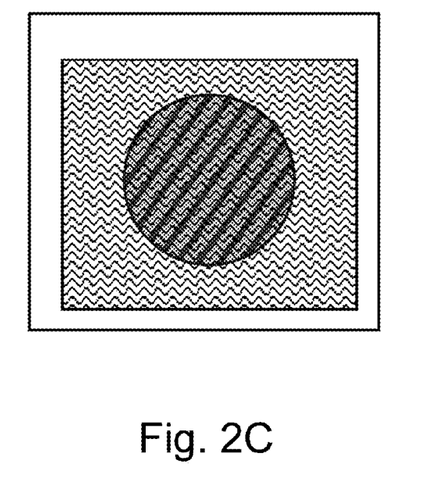
Figure 2D:
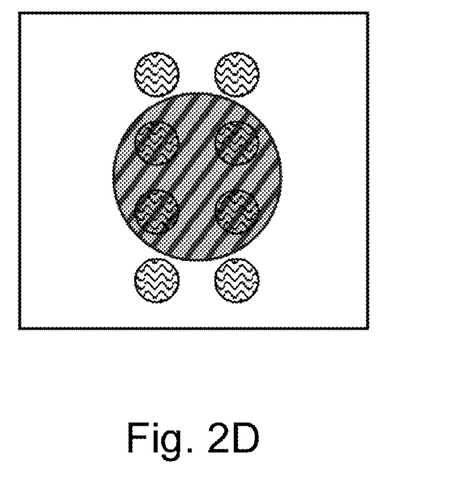
Figure 2E:
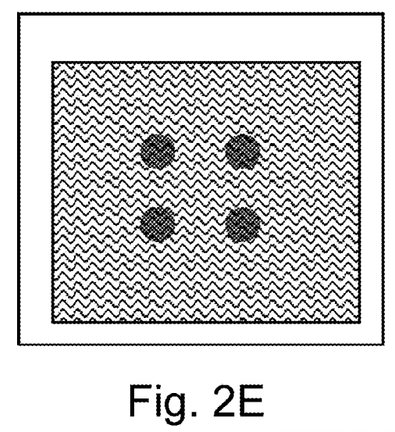
Figure 2F:
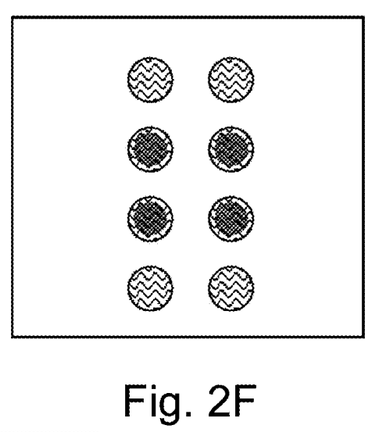

The particles are patterned such that the desired temperature distribution is achieved. The interaction areas between the heating light source(s) and absorbing particles define the size and location of the cells which give rise to the lensing effect because of their interactions with the thermo-optical materials. By interaction areas, it is implicit that the size and/or location of the cells is not necessarily exactly the same as the physical overlapping between the absorbing material and the heating light source but rather the optical interaction area. The disclosure can incorporate any configuration for the interaction areas between the absorbing material and the heating light source. In FIG. 2A, a scanning electron microscopy (SEM) image of a large and continuous array of gold photoabsorbers, deposited by electron beam lithography, can be seen. FIG. 2B shows a SEM image of isolated photo-absorber areas, within each area there are many single photo-absorbing particles. FIG. 2C is a sketch of a single photoabsorbing area which is illuminated with a light source that is smaller than the size of the absorbing area. In this case the size and location of the cell is defined by the light source, while FIG. 2E shows separated photoabsorbing areas. In the latter, the light source is larger than one isolated area, and covers four areas, there are thus four cells and their locations are defined by the illuminated photo absorbing areas. FIG. 2E shows one continuous area of photoabsorbers with four separated light sources, where the size and location of the cells are defined by the beams. In FIG. 2F, separated photoabsorbing areas can be seen, where four areas are partially illuminated by four light sources. The size and location of the cells are defined by the overlapping region (or interaction area) between the light beams and the photoabsorbers.

In some embodiments, the cells are inside or on a substrate. The substrate can be made of glass, quartz, silica, plastics, or polymers among others. This enables to use the lens in a transmission configuration. Alternatively, the substrate could be made of an opaque material such as silicon, etc. which enables to use the disclosure in reflection mode. Also, the substrate can have a dependence of the light transmission (for example spectral, angle or polarization dependence), which enables to work in transmission and reflection mode simultaneously. This kind of substrate can be created by different means including a layered media or a dichroic element.

Figure 3:
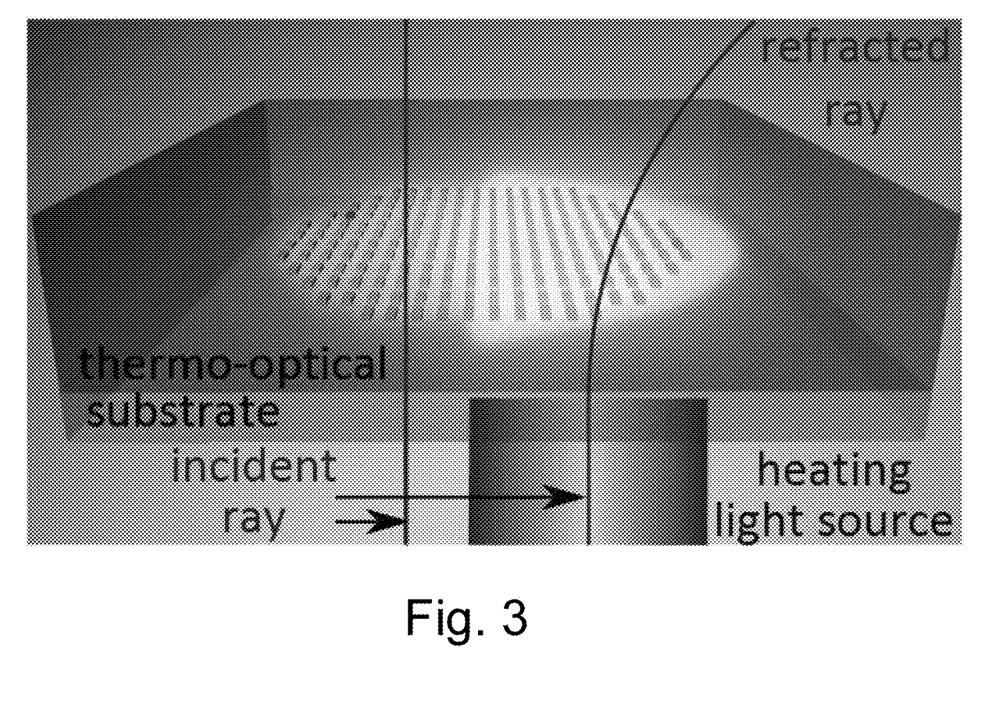
FIG. 3 shows how the temperature in the vicinity of photo-absorbing particles is increased in presence of a heating laser, which results in the lensing of an incoming light source.

FIG. 3 illustrates a cell created on half of the patterned photo-absorber area delimited by a disc shape and made of nano-particles (gold nano-antennas, as in FIG. 4A) by shining a heating light source (infra-red laser of wavelength 800 nm, for example).

The particles can be positioned on top of a substrate, patterned onto the same. The photo absorbing particles can be made of different materials including metals (for example gold, silver or copper), alloys (for example titanium nitride or silicon carbide) and semiconductor materials (for example silicon or germanium). The pattering can be done by e-beam lithography, photo-lithography, laser writing, evaporation, sputtering, reactive ion etching (RIE) and/or chemical vapor deposition (CVD).

A particularly advantageous embodiment uses electron-beam lithography and evaporation techniques to fabricate gold micro and nano structures (see the scanning electron microscope images in FIGS. 2A-B (patterning of the absorber on a substrate) and FIG. 4A (size and shape of two different absorbing structures)).

The photo absorbing particles can be structured at any scale, namely: macro, meso, micro and nano scales. This structuration could be used to reduce the size of the lens and/or to enhance the efficiency of light to heat energy conversion of the photo absorbing material. An example of such an enhancement is given by using plasmonic nano structures such as: nano antennas, nanorods, nano holes, nanoparticles, nano stars, nano oligomers, multi branch nano particles amongst others. FIGS. 4 and 5 show that the use of plasmonic structures enables the enhancement of the lensing effect (FIGS. 4A-E) and to control the size and shape of the cells (FIGS. 5A-D) by taking advantage of the resonances supported by these nanostructures. Plasmonic nano particles are thus preferred, as they provide better results, but the disclosure is not limited to such particles.

Figure 4B:
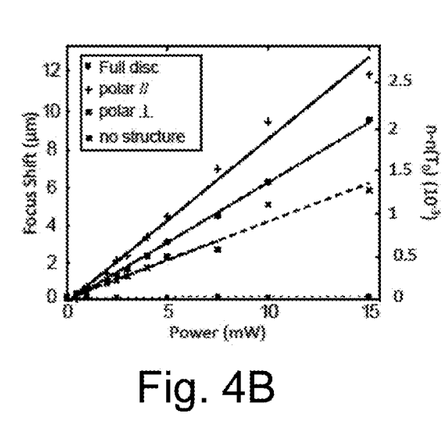
Figure 4C:
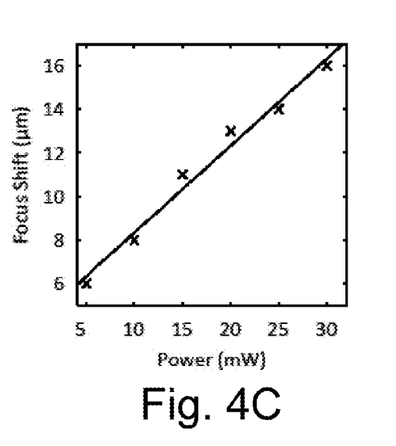
Figure 4D:
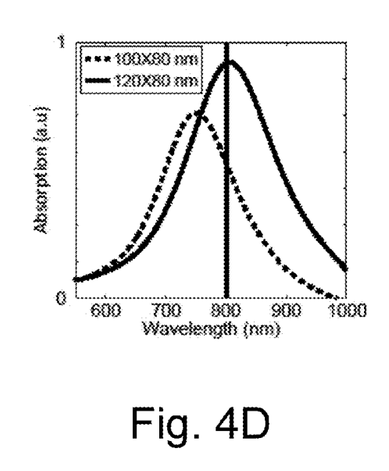
Figure 4E:
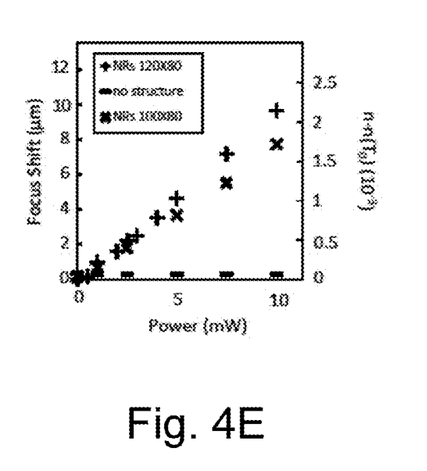

FIGS. 4A-E show an efficient plasmonic heating for a thermal lens and lens transfer function characterization. FIG. 4A are SEM images of a full 5 µm radius gold disc (left), and a 5 µm radius disc made of Nano-Rods (NR) (right). A higher magnification image of the 120×80×50 nm nano rods is presented. The corresponding absorption spectrum displays a Surface Plasmon Resonance (SPR) at 800 nm. FIG. 4B shows a focus shift and optical index variation in dependence of a 800 nm laser power shined on a NR disc (from FIG. 4A) excited at the SPR with a parallel polarization (black crosses+), a NR disc excited off resonance using a perpendicular polarized configuration (black crosses X), a full gold disc (black dots) and in absence of any structure (black squares). FIG. 4C shows the linear dependence of the focus shift for the disc made of nano-rods excited at the SPR (similar to + in b.) as a function of the 800 nm heating laser power until a power of 30 mW. In FIG. 4D, absorption spectra can be seen, recorded on two different arrays made of gold nano-rods having slightly different sizes (100×80 nm and 120×80 nm). The morphology change results in a shift of the SPR spectral position. The absorption of these two different morphologies of photoabsorbing particles is different for the considered heating light source. In FIG. 4E, a focus shift and optical index variation in dependence of an 800 nm laser power shined on the two different areas are described.

An array made of gold nanorods (120×80×50 nm3) positioned with a pitch of 300 nm (FIG. 4A right top and bottom) was fabricated, that lead to a maximum of absorption at 800 nm (FIG. 4A bottom left) at their longitudinal plasmon mode (i.e., for the incident field linearly polarized along the nanorods long axis). The gold nanorods are patterned in an area of a disc having a radius of 5 micrometers (FIG. 4A top right). Also fabricated was a full gold disc with a 5 micron radius (FIG. 4A top left). To heat the structures, a laser light source with a wavelength of 800 nm linearly polarized along the principle axis of the nanorods was used.

The relationship (e.g., transfer function) between the incoming heating laser power and the resulting focus shift of an incident light source (blue laser diode of wavelength 473 nm) was measured (FIG. 4C). The heating beam was set to a radius of 5 µm.

A linear dependence of the focus shift for the gold disc made of nano-rods as a function of laser power for the range of 0-30 mW was obtained.

Consequently, the focus shift of a NR disc (as before) as illuminated with the same 800 nm laser was measured, in the power range of 0-15 mW both for parallel and perpendicular polarization. The resulting linear dependence is presented in FIG. 4B. This result is again given for a focus shift of a 473 nm diode laser. Also, the focus shift as function of incoming heating laser (800 nm) power was recorded for a full gold disc with radius of 5 µm (a single particle), for powers spanning the range of 0-15 mW (FIG. 4B). Finally, the focus shift when there is no absorbing structure was measured for different heating powers (FIG. 4B). For all these experiments, the resulting temperature was measured (using a method called fluorescence polarization anisotropy), from which the change in refractive index was extracted for each case (FIG. 4B).

In yet another experiment, the absorption spectra on two different arrays made of gold nano-rods having slightly different sizes (100×80 nm and 120×80 nm in both pitch of the NRs is 300 nm) was measured (FIG. 4D). The morphology change causes a shift of the SPR spectral position. The absorption of these two absorbing structures is therefore different for a considered heating light source.

Consequently, the focus shift and optical index variation in dependence of a 800 nm laser power (0-10 mW) shined on these two different areas made of gold NRs and delimited by the same disc shape (radius of 5 µm) are different as shown in FIG. 4E.

Figure 5A:
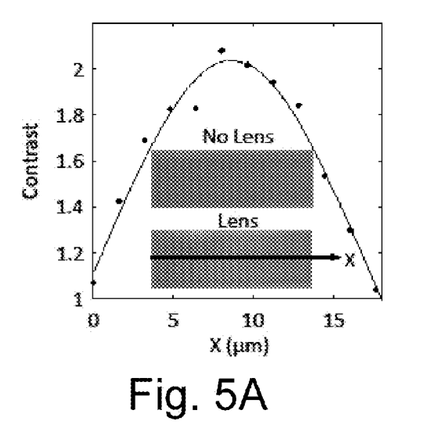
FIGS. 5A-D characterize the size and shape of different experimental lenses.

FIG. 5A shows the contrast improvement of a 2.5 µm grating (as a function of the location X) due to thermal lensing. From the contrast improvement, the in-plane lateral size of the region where the refractive index of the thermo-optical material is modified was characterized. This was done by imaging a grating in absence and in presence of a heating light source (infra-red laser beam of wavelength 800 nm in this case, images are presented in the inset of FIG. 5A) acting on a patterned photo-absorber area (as in FIG. 2C for one laser beam, radius of the beam is 5 µm).

To characterize the size and shape of a cell, the contrast of a 2.5 grating is calculated with thermal lensing normalized by the contrast without a thermal lens as a function of the location X (FIG. 5A). To this end, the grating is placed above a thermal lens made of: (i) an array of photo absorbing particles as described above and in FIG. 4A; (ii) water as the thermo-optical material; and (iii) a 800 nm heating laser beam focused to a radius of 5 µm. The in-plane lateral size of the region where the refractive index of the thermo-optical material is modified to be 6.5 µm (by measuring the FWHM of the contrast ratio graph) was determined.

Figure 5B:
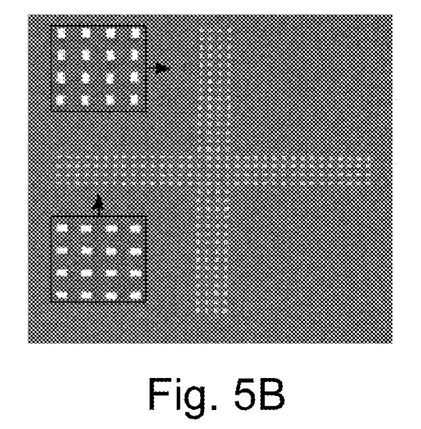
Figure 5C:
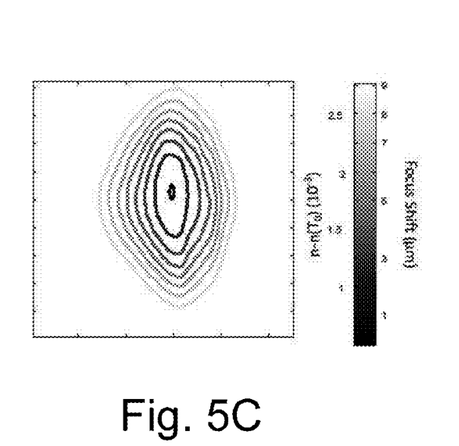
Figure 5D:
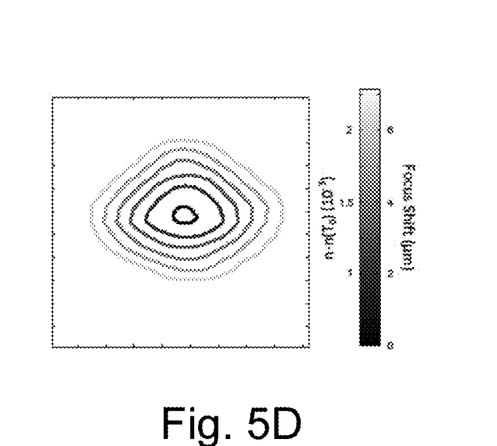

FIGS. 5B-D show the possibility to dynamically change the size and shape of a cell by modifying the heating light source properties. Specifically, as shown in FIGS. 5C-D, the polarization while keeping the same patterned absorbing material was changed. FIG. 5B presents a SEM image of a cross shape structure made of nanorods (NR) by electron beam lithography followed by gold evaporation. The NR are similar to the ones displayed in the FIG. 4A bottom right and present a resonance in the near infrared at 800 nm. The two insets of FIG. 5B correspond to a zoom of each arm of the cross and show that the nano-rods are oriented perpendicularly in each arm. FIG. 5C shows local focus shift for a heating laser light source of 800 nm with a polarization oriented along the vertical direction of FIG. 5B so that the nanorods of the vertical axis of the cross are resonant with the excitation and therefore efficiently absorbs the light. In FIG. 5D, the incident heating light polarization is oriented along the horizontal direction. In both FIGS. 5C and 5D, the asymmetric nature of the thermal lens can be evidenced, as well as the local control of the focus shift by changing the incoming polarization while keeping the same patterned absorbing material and heating light source size and power.

FIGS. 5B-D also show the possibility to locally and dynamically change the focal points within a single element by modifying the heating light source properties (polarizations in FIG. 5C-D) while keeping the same patterned absorbing material. The heating light source is focused to an area larger than the considered photo-absorbing particles array presented in FIG. 5B. In this case, the interaction area between the heating light source and the considered photoabsorbing particles array defines the size and shape of the induced thermal lens (as sketched in FIG. 2D). More precisely, FIG. 5B is a SEM image of a cross shape structure made of nanorods (NR) by electron beam lithography. The NR are similar to the ones displayed in FIG. 4A (top and bottom right) and present a resonance in the near infrared at 800 nm. The two insets correspond to a zoom of each arm of the cross and show that the nano-rods are oriented perpendicularly in each arm. FIG. 5C shows a local focus shift for a light polarization oriented along the vertical direction of FIG. 5C so that the nanorods of the vertical axis of the cross are resonant with the excitation and therefore absorbs efficiently the light. FIG. 5D is the same as FIG. 5C, but with the incident light polarization oriented along the horizontal direction.

Figure 6:
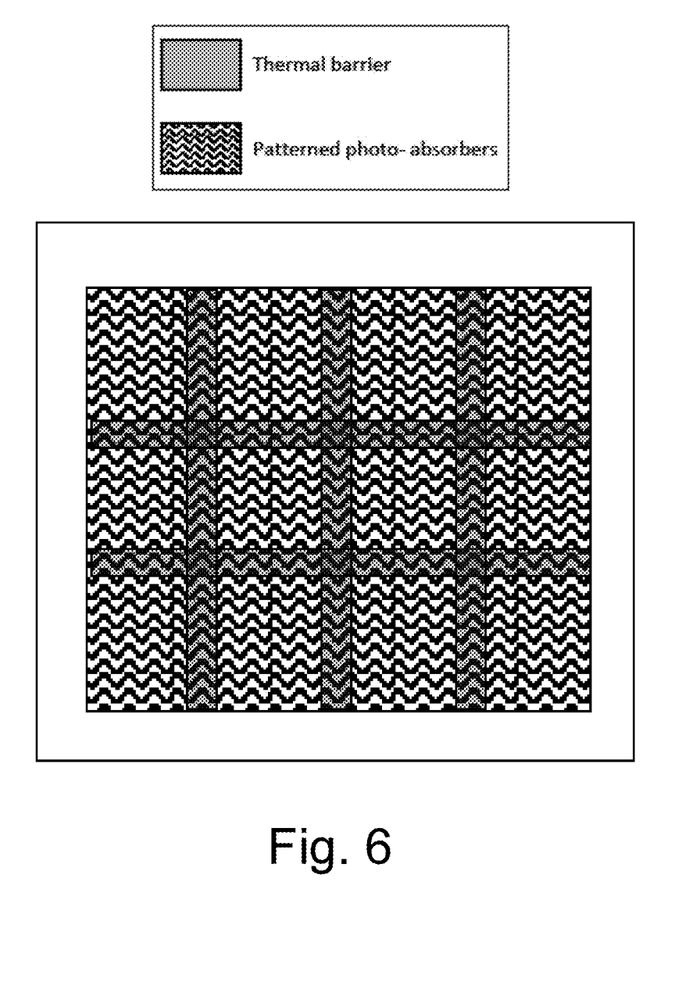
FIG. 6 is a schematic illustration of the use of a thermal barrier between adjacent temperature controlled regions to provide thermal isolation between regions.

All these embodiments can be considered for a uniform thermo-optical material or a thermo-optical material patterned with thermal barriers as shown in FIG. 6.

Figure 7A:
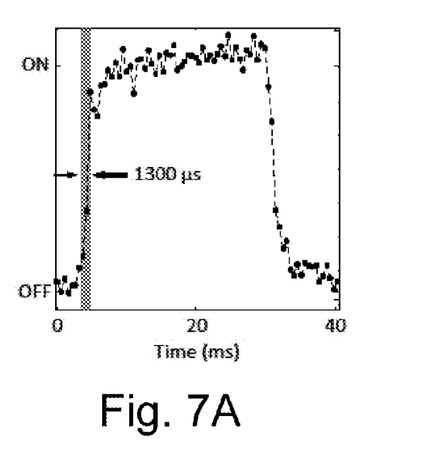
FIGS. 7A-D characterize the time response required for a cell to adjust the focus while changing the energy absorbed by the photo absorbing material.
Figure 7B:
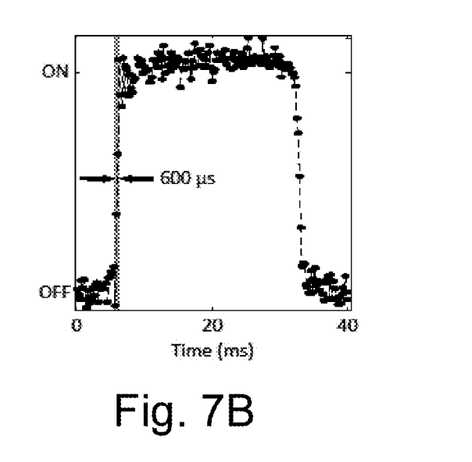
Figure 7C:
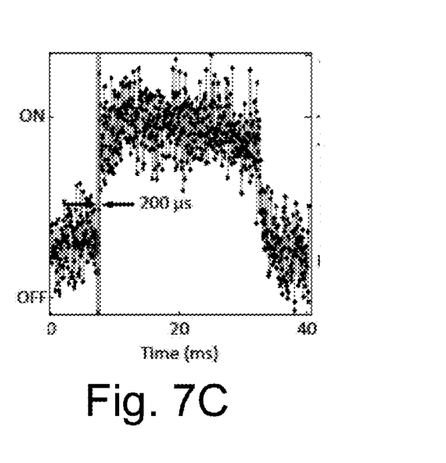
Figure 7D:
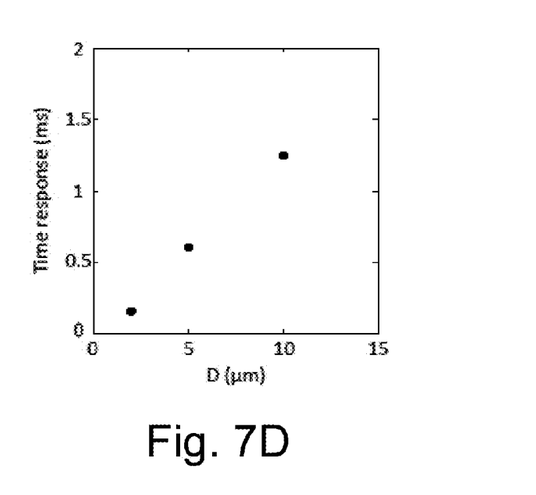

In FIGS. 7A-D, the time response of the thermal lens in dependence on the size of the interaction area is shown. FIGS. 7A-C show the rise time of the thermal lens made of a 10, 5, and 2 µm diameter disc in FIGS. 5A, 5B, and 5C, respectively. The discs are made of gold nano rods (as in FIG. 4A on the top right). Experimental results of the rise time are plotted as function of the disc diameter in FIG. 7D.

In this text, the term "comprises" and its derivations (such as "comprising", etc.) should not be understood in an excluding sense, that is, these terms should not be interpreted as excluding the possibility that what is described and defined may include further elements, steps, etc.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

On the other hand, the disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The present subject matter may be embodied in other specific forms without departing from its spirit or essential characteristics. The described embodiments are to be considered in all respects only as illustrative and not restrictive.

What is claimed is:

1. An adaptive photo thermal lens, comprising:
   at least one cell, each cell provided with at least one photo absorbing particle; and
   a thermo-optical material in thermal contact with the cells;
   wherein at least one spectral component emitted from at least one controllable light source can be absorbed by the photo-absorbing particles, wherein each cell is defined by the optical interaction area between the at least one photo absorbing particle and the at least one controllable light source.

2. The adaptive photo thermal lens of claim 1, wherein the photo absorbing particles are patterned on a substrate.

3. The adaptive photo thermal lens of claim 1, wherein the photo absorbing particles are plasmonic particles, wherein the plasmonic particles have a plasmonic resonance and the at least one controllable source is adapted to emit at the j plasmonic resonance.

4. The adaptive photo thermal lens of claim 3, wherein the plasmonic particles are one or more of nano antennas, nanorods, nano holes, nanoparticles, nano stars, nano oligomers and/or multi branch nano particles.

5. The adaptive photo thermal lens of claim 4, wherein the plasmonic particles are Au nano particles.

6. The adaptive photo thermal lens of claim 1, wherein the thermo-optical material is selected from the group comprising water, glycerol or octane.

7. The adaptive photo thermal lens of claim 1, provided with an array of cells, each cell being defined by the spot size of the at least one controllable light source.

8. The adaptive photo thermal lens of claim 1, provided with an array of cells, wherein the cells are defined by the physical location of the photo absorbing particles.

9. The adaptive photo thermal lens of claim 1, wherein the at least one controllable light source is a single source and the adaptive photo thermal lens further comprises a galvanometric mirror for providing different positions of a spot of the single source.

10. The adaptive photo thermal lens of claim 1, provided with a plurality of light sources.

11. The adaptive photo thermal lens of claim 1, wherein the at least one photo absorbing particle is patterned onto an already existing lens.

12. A micro lens array, comprising:
a plurality of adaptive photo thermal lenses comprising:
- at least one cell, each cell provided with at least one photo absorbing particle; and
- a thermo-optical material in thermal contact with the cells; and at least one controllable light source for illuminating the photo absorbing particles, the light source having at least one spectral component which can be absorbed by the photo-absorbing particles, each cell being defined by the optical interaction area between the at least one photo absorbing particle and the at least one controllable light source, wherein the at least one controllable light source is controllable in one or more of wavelength, power, and polarisation.

13. The micro lens array of claim 12, wherein the photo absorbing particles are plasmonic particles, wherein the plasmonic particles have a plasmonic resonance and the at least one controllable light source is adapted to emit at the plasmonic resonance.

14. The micro lens array of claim 13, wherein the plasmonic particles are one or more of nano antennas, nanorods, nano holes, nanoparticles, nano stars, nano oligomers and/or multi branch nano particles.

15. The micro lens array of claim 14, wherein the plasmonic particles are Au nano particles.

16. The micro lens array of claim 12, wherein the at least one controllable light source is a single source and the micro lens array further comprises a galvanometric mirror for providing different positions of a spot of the single source.

17. A method, comprising:
providing at least one adaptive photo thermal lens, each lens comprising:
- at least one cell comprising at least one photo absorbing particle; and
- a thermo-optical material in thermal contact with the at least one cell;

providing at least one controllable light source, the light source having at least one spectral component which can be absorbed by the photo-absorbing particles, each cell being defined by the optical interaction area between the at least one photo absorbing particle and the at least one controllable light source, wherein the at least one controllable light source is controllable in one or more of wavelength, power, and polarisation; and illuminating at least one spot of the photo absorbing particles with the at least one controllable light source, thereby modulating the refractive index of a portion of thermo-optical material.

18. The method of claim 17, wherein the at least one controllable light source is a single source and the micro lens array further comprises a galvanometric mirror, wherein the method further comprises manipulating the galvanometric mirror to change position of the spot that is illuminating the photo absorbing particles.

19. The method of claim 17, further comprising using the at least one adaptive photo thermal lens to control light from a second light source.

20. The method of claim 19, wherein the focal depth of the light from the second light source is controlled by the at least one adaptive photo thermal lens.

* * * * *